US006979517B2

(12) United States Patent
Goda et al.

(10) Patent No.: US 6,979,517 B2
(45) Date of Patent: Dec. 27, 2005

(54) ELECTRODE PLATE FOR CELL AND METHOD FOR MANUFACTURING THE SAME

(75) Inventors: Yoshio Goda, Yao (JP); Toru Inagaki, Kamakura (JP); Akihiro Maeda, Toyohashi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 346 days.

(21) Appl. No.: 10/258,830

(22) PCT Filed: May 1, 2001

(86) PCT No.: PCT/JP01/03802

§ 371 (c)(1),
(2), (4) Date: Oct. 28, 2002

(87) PCT Pub. No.: WO01/84656

PCT Pub. Date: Nov. 8, 2001

(65) Prior Publication Data

US 2003/0143466 A1 Jul. 31, 2003

(30) Foreign Application Priority Data

Apr. 28, 2000 (JP) .............................. 2000-128674
Jan. 30, 2001 (JP) ................................ 2001-21522

(51) Int. Cl.[7] ............................ H01M 4/74; H01M 4/82
(52) U.S. Cl. .............................. 429/243; 429/245; 29/2; 205/238; 205/557
(58) Field of Search .................. 429/241, 242, 429/243, 245; 29/2; 204/238, 557; 205/238, 205/557

(56) References Cited

U.S. PATENT DOCUMENTS

| 1,144,628 | A | * | 6/1915 | Atwater et al. | ............. | 429/241 |
| 3,798,070 | A | * | 3/1974 | Ruben | ..................... | 429/245 X |
| 4,363,857 | A | | 12/1982 | Mix | ............................ | 429/234 |
| 4,824,744 | A | * | 4/1989 | Kuo et al. | ............... | 429/245 X |
| 5,136,765 | A | * | 8/1992 | Tanaka et al. | ................ | 29/2 X |
| 6,566,010 | B1 | * | 5/2003 | Bhardwaj et al. | ........ | 429/245 X |
| 6,605,388 | B1 | * | 8/2003 | Goda et al. | ............. | 429/243 X |
| 2002/0090554 | A1 | * | 7/2002 | Chen | ........................... | 429/241 |
| 2003/0148186 | A1 | * | 8/2003 | Muraoka et al. | ............ | 429/243 |

FOREIGN PATENT DOCUMENTS

| EP | 0941781 | 9/1999 |
| JP | 53-128544 | 11/1978 |
| JP | 60-67664 | 5/1985 |
| JP | 03-204126 | 9/1991 |
| JP | 04-165006 | 6/1992 |
| JP | 4-504482 | 8/1992 |
| JP | 05-290853 | 11/1993 |

(Continued)

*Primary Examiner*—Stephen J. Kalafut
(74) *Attorney, Agent, or Firm*—Jordan and Hamburg LLP

(57) ABSTRACT

The battery electrode plate includes a core member (1) which is densely coated with a mixture paste chiefly including an active material (2). The core member (1) is made of a metal sheet (3), which is formed with rows (8) of first and second bowed portions (4, 7) arranged along one direction (X) of the metal sheet so as to protrude alternately on the front and back sides of the metal sheet, the rows (8) of bowed portions arranged along the direction (Y) orthogonal to the direction (X) with flat parts (9) of a predetermined width interposed between each two rows. The battery electrode plate is produced by any of a reciprocating type continuous press method, a rotary type molding method, and an electrolytic deposition method.

18 Claims, 10 Drawing Sheets

FOREIGN PATENT DOCUMENTS

| | | |
|---|---|---|
| JP | 07-130370 | 5/1995 |
| JP | 07-335208 | 12/1995 |
| JP | 08-236120 | 9/1996 |
| JP | 09-289025 | 11/1997 |
| JP | 10-079253 | 3/1998 |
| JP | 11-260373 | 9/1999 |
| JP | 11-260418 | 9/1999 |
| WO | WO 90/06001 | 5/1990 |

* cited by examiner

ELECTRODE PLATE FOR CELL AND METHOD FOR MANUFACTURING THE SAME

TECHNICAL FIELD

The present invention relates to a battery electrode plate constructed by coating a core member with a mixture paste that chiefly includes an active material, and a method for producing such battery electrode plate at low cost with high throughput and precision.

BACKGROUND ART

Positive and negative electrode plates of batteries are constructed by densely coating core members, which will function as current collectors of the batteries, with respective mixture pastes of positive and negative active materials. Various materials have been used for the core member, such as sintered substrates (e.g. Japanese Patent Laid-Open Publication No. Hei. 4-165006), foamed porous metal substrates (e.g. Japanese Patent Publication No. Sho. 57-39317), punched, corrugated substrates (e.g. Japanese Patent Laid-Open Publication No. Hei. 7-130370), punched metal substrates, and expanded metal substrates (e.g. Japanese Patent Laid-Open Publication Nos. Hei. 3-204126 and Hei. 7-335208).

Core members are desired to have such properties as a high current collecting efficiency, an excellent active material-retaining capability, a small volume for a higher energy density, and a structure that allows a good flow of ions and gas that are generated from liquid electrolyte or through chemical reactions inside the battery. In addition to these requirements, it is desired that the core members be manufactured on a low-cost, mass production basis. None of the conventional core members mentioned above has yet satisfied all of the requirements for the properties, costs, and mass producibility in a well-balanced manner.

That is, the prior art core members mentioned above each have some favorable properties of their own, but they are all produced through a relatively large number of process steps, and therefore they have the common problems of high production costs and poor mass producibility. The characteristics of each of the prior art core members will be described below. Sintered substrates contribute to good current collecting properties when constructed as electrode plates and they are also excellent in the capability of retaining the active material. On the other hand, they are not suitable for achieving a higher energy density of electrode plates, because of the low proportion of pores which retain the active material.

Foamed porous metal substrates have an extremely high porosity and a high specific surface area and they exhibit outstanding large current discharge characteristics as compared to other core members. One drawback of this type of substrates is that short circuiting tends to occur resulting from burrs on the metal. Another reason for the frequent short circuiting is that the electrode plate obtained by coating a foamed porous metal substrate with a mixture paste and by rolling same includes a portion on its surface where metal is exposed. The most significant drawback, however, of foamed porous metal substrates is high costs.

Punched and embossed substrates are apt to stretch when subjected to tension or rolling, and so they can readily be deformed. Another disadvantage is that short circuiting tends to occur because of the burrs which are formed when punching the substrates and which are left intentionally so as to enhance the capability of retaining the active material.

Punched metal substrates and expanded metal substrates are of flat shape and the active materials contained in the mixture paste which is coated on both sides of the substrates are merely bound together by a binder in the mixture paste. Thus their active material-retaining capability tends to be insufficient. Particularly when they are formed into a spiral electrode plate assembly, the active materials can easily peel off, thereby shortening the battery life. Also, because these core members are of flat shape, the resultant electrode plates are inherently poor in the current collecting properties in their thickness direction.

Researches have been carried out to deal with the above problems and to develop a core member that can satisfy all the requirements for various properties, costs, and producibility in a well-balanced manner. For example, with regard to the expanded metal substrates, Japanese Patent Laid-Open Publication No. Hei. 3-204126 proposes a method of producing an expanded mesh sheet, which is an improved version of the method of producing an expanded mesh sheet disclosed in Japanese Patent Publication No. Sho. 60-29573 (whereby a mesh sheet is obtained in which a multiplicity of strings form a lattice-like pattern with the knots arranged in a zigzag fashion).

One requirement regarding such expanded mesh sheet was to make it thinner so as to achieve a higher energy density. Thus various proposals have been made, such as a method of producing an expanded mesh sheet (Japanese Patent Laid-Open Publication No. Hei. 11-260373), whereby a metal lath of a fine mesh including plain parts is obtained by a reciprocating type slit forming method. Also, a non-aqueous electrolyte battery (proposed in Japanese Patent Laid-Open Publication No. Hei. 11-260418) employs an expanded metal substrate, which is cut out from a band-like, metal lath sheet of a thickness of 0.1 mm or lower. The metal lath sheet has plain parts along its lengthwise direction at given locations in its widthwise direction, and these plain parts correspond to the lead connecting portions of the cut-out substrates. However, these expanded mesh sheets (or expanded metal substrates) can only provide two-dimensional core members, and therefore the resultant core members are inferior in the current collecting properties in the thickness direction.

A possible option to improve the current collecting properties in the thickness direction of such two-dimensional core members (or, in other words, to achieve three-dimensional current collecting properties) is to add carbon, as a conductive agent, to the mixture paste that chiefly includes an active material. However, this will not work for a nickel hydride rechargeable battery, for example, which is one of the batteries that require three-dimensional current collecting properties, because, if carbon is added as a conductive agent to the positive electrode mixture of such battery, it will be oxidized during charging, producing carbon dioxide ions. Thereby the internal resistance of the battery will increase, and also the active material will easily peel off with the expansion and shrinkage of the battery as it is charged and discharged. As a result, the battery life will be shortened. Because of these reasons, the foamed porous metal substrate has been used for the positive electrode plate of nickel hydride rechargeable batteries. However, the foamed porous metal substrate has the drawback of high costs as mentioned above, and also, it is difficult to provide plain parts, which will be required for bonding a current collector to the resultant electrode plate or electrode plate assembly, in the substrate. Moreover, an attempt to make the substrate thinner will result in a decrease in the porosity, which is contrary to the desire to achieve a high capacity density.

In light of the above-described prior art problems, it is an object of the present invention to provide a thin battery electrode plate, which has excellent properties such as a high strength against the tension applied during a rolling process and a low risk of inner short-circuiting, and which can be mass produced at low cost, but achieve three-dimensional current collecting properties and a method of producing such battery electrode plate.

DISCLOSURE OF THE INVENTION

In order to achieve the above objects, the present invention provides a battery electrode plate characterized in that a core member is densely coated with a mixture paste chiefly including an active material, wherein the core member is made of a metal sheet, the metal sheet being formed with strips of first and second bowed portions alternately protruding on the front and back sides of the metal sheet along one direction of the metal sheet, thus forming a plurality of protruding rows, the protruding rows being arranged along a direction orthogonal to the above-mentioned one direction with flat parts of a predetermined width interposed between each two protruding rows.

A method of producing a battery electrode plate according to the present invention is characterized by including the steps of: intermittently feeding a band-like metal sheet into between an upper die and a lower die that are driven in mutually approaching and retreating directions; forming a core member, in such a manner that when the upper die and the lower die are driven to advance to respective positions in proximity to each other, a plurality of slits are formed in the metal sheet at locations where respective blades of the upper die and the lower die interengage with each other, and at the same time strip-like portions formed between each adjacent slits are pushed up by a plurality of bumps on the lower die to form first bowed portions and pushed down by a plurality of bumps on the upper die to form second bowed portions in an alternate arrangement, the alternately arranged first and second bowed portions forming a plurality of protruding rows, and flat parts are formed between each two protruding rows at locations where respective non-processing parts of the upper die and the lower die interengage with each other; and densely coating the core member with a mixture paste chiefly including an active material.

Another method of producing a battery electrode plate according to the present invention is characterized by including the steps of: continuously feeding a band-like metal sheet into between a pair of processing rolls that are driven to rotate in synchronization with each other; forming a core member in such a manner that a plurality of slits are formed in the metal sheet at locations where respective blades of disk cutters of both processing rolls interengage with each other, and at the same time strip-like portions formed between each adjacent slits are pushed in opposite directions in an alternate arrangement by respective bumps on both processing rolls to form first and second bowed portions, respectively, the alternately arranged first and second bowed portions forming a plurality of protruding rows, and flat parts are formed between each two protruding rows at locations where respective non-processing parts of both processing rolls interengage with each other; and densely coating the core member with a mixture paste chiefly including an active material.

A yet another method of producing a battery electrode plate according to the present invention is characterized by including the steps of: rotating a metallic electrolytic deposition drum in one direction in an electrolyzer as being immersed in electrolyte therein, so that metal contained in the electrolyte is electrolyzed and continuously deposited on the circumferential surface of the electrolytic deposition drum, in which the metallic electrolytic deposition drum has a plurality of rows of bumps and dents on its circumferential surface arranged along its circumferential direction with flat parts interposed between each two rows, each of the rows comprising a plurality of curved bumps and curved dents alternately arranged along the axial direction of the electrolytic deposition drum; peeling the metal deposited on the electrolytic deposition drum in the form of a foil to obtain a core member; and densely coating the core member with a mixture paste chiefly including an active material.

A battery according to the present invention comprises a positive electrode plate, a negative electrode plate, at least one of which is constructed with the battery electrode plate according to the present invention, a separator interposed between the positive electrode plate and the negative electrode plate, the positive electrode plate, the separator, and the negative electrode either being rolled or superposed upon one another to form an electrode plate assembly, a liquid electrolyte, and a battery case in which the electrode plate assembly is accommodated together with the liquid electrolyte.

BEST MODE FOR CARRYING OUT THE INVENTION

Figure 1:
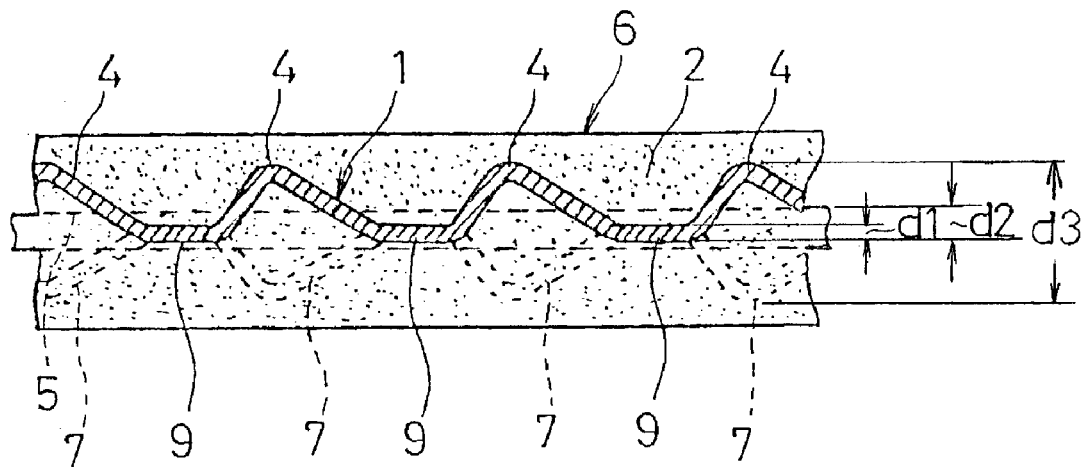
FIG. 1 is a longitudinal cross-section illustrating a battery electrode plate according to a first embodiment of the present invention.

Preferred embodiments of the present invention will be described below with reference to the drawings. FIG. 1 is a longitudinal cross-section illustrating an electrode plate for a battery according to a first embodiment of the present invention. This battery electrode plate is constructed such that a strip of core member 1 is densely coated with a mixture paste that chiefly includes an active material 2 of either positive electrode or negative electrode. An active material layer 6 is thus formed on both sides of the core member 1.

Figure 2:
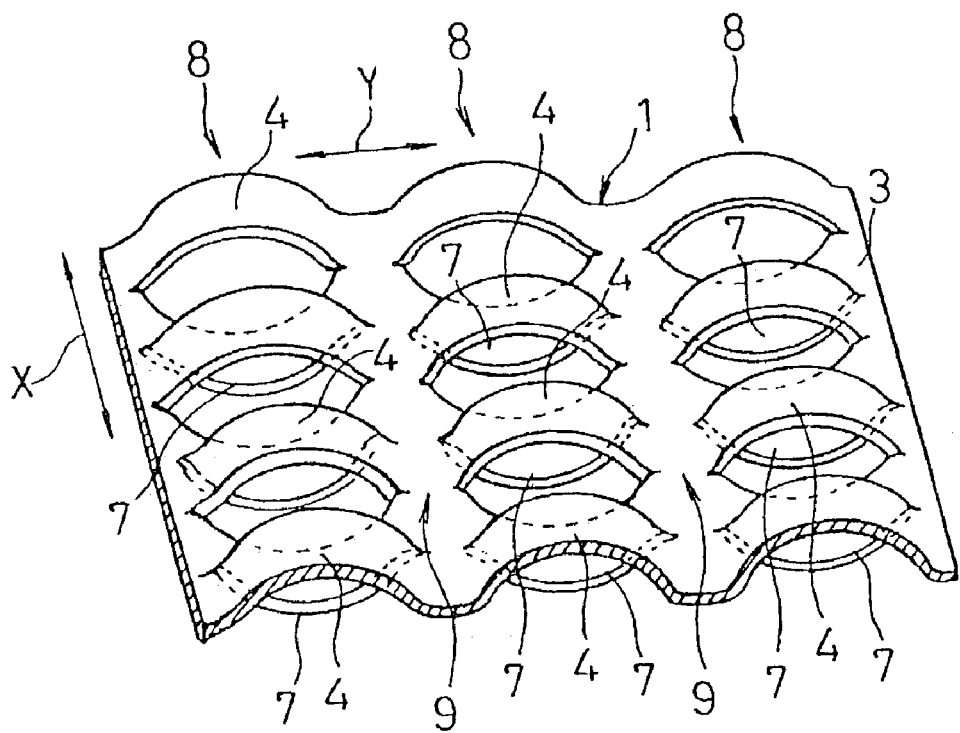
FIG. 2 is a perspective view illustrating a core member of the battery electrode plate.
Figure 3:
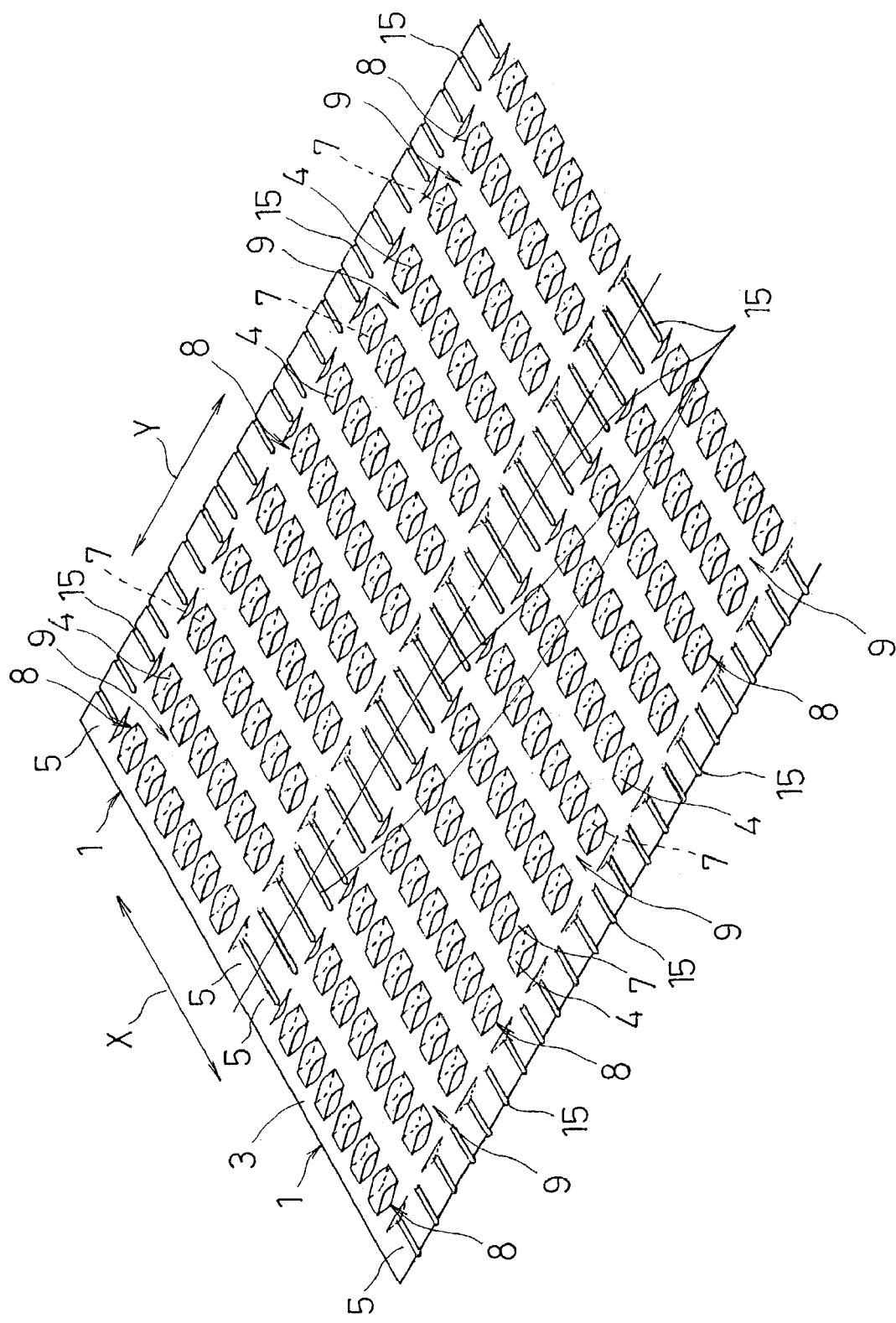
FIG. 3 is a perspective view illustrating a core member in its entirety, which has plain parts formed with grooves and ridges.

FIG. 2 is a perspective view illustrating the core member 1, and FIG. 3 is a perspective view illustrating the core member 1 in its entirety, which has plain parts 5 formed with grooves 15 (and ridges). The core member 1 is made of a metal sheet 3 which is formed with strips of first bowed portions 4 and second bowed portions 7 arranged parallel to each other along one direction X of the metal sheet 3 and alternately protruding on the front and back sides of the metal sheet. A large number of rows 8 of such bowed portions are arranged along the direction Y that is orthogonal to direction X, with flat parts 9 of a predetermined width interposed between each two rows. In this particular embodiment, direction Y is the direction of length of the band-like metal sheet 3, and direction X is the direction of width of the band-like metal sheet 3. Accordingly, the strips of bowed portions 4 and 7 are arranged such that their longer sides are directed parallel to the lengthwise direction Y of the core member 1.

The metal sheet 3, before being formed with the bowed portions 4 and 7 to be the core member 1, includes foil that is made of any of nickel, copper, aluminum, iron, and an alloy that is chiefly composed of these metals. Alternatively, in addition to metal foils, iron or copper foil plated with nickel, or iron foil plated with copper may be used. Such a plated metal is preferably formed to have a plated layer of 1 to 5 $\mu$m in thickness relative to row material of 20 $\mu$m thickness. The metal sheet 3 including either metal foil or plated metal is further processed to have a rough surface before or after the formation of the bowed portions 4 and 7, so that the core member 1 made of this metal sheet 3 will have an enhanced capability to retain the active material 2. The rough finishing of the metal sheet 3 can be achieved by any known methods such as electrolytic deposition, etching, sandblast, roll transfer, metal spraying, and powder sintering.

The core member 1 also includes plain parts 5 as shown in FIG. 1 and FIG. 3 where no bowed portions 4 and 7 are formed. The plain parts 5 are provided parallel to each other along the lengthwise direction Y of the core member 1, at least along one edge of the core member 1. FIG. 3 shows one example in which plain parts 5 are formed parallel on both edges of the core member 1 along its lengthwise direction Y. A large number of grooves 15 arranged parallel to each other are provided in the plain parts 5 so as to form a corrugated surface. The plain parts 5 may be formed with a multiplicity of parallel ridges to achieve the corrugation in place of providing the grooves 15.

The thickness d2 of the plain parts 5 in the metal sheet 3 may be set larger than the thickness d1 of bowed portions 4 and 7 and flat parts 9, as shown in FIG. 1. As clearly seen from FIG. 1, the core member 1 constituting the battery electrode plate is entirely embedded including the bowed portions 4 and 7 in the active material layer 6 which is formed by applying a mixture paste of an active material 2, a conductive agent, and a binder on both sides of the core member.

The core member 1 having the configuration described above, as will be described later, is readily produced through simple steps in which bands of metal sheet 3 undergo a reciprocating type continuous press method or a rotary type molding method as they are fed continuously. Thus the core member 1 is mass-produced at low cost. The production of the core member 1 according to these methods involves forming numerous slits in band-like metal sheet 3. Such slits can, for example, be provided by employing the method of producing an expanded mesh sheet disclosed in Japanese Patent Laid-Open Publication No. Hei. 11-260373. The method disclosed in this publication enables a number of slits to be formed in a sheet along the lengthwise direction of the sheet intermittently in a zigzag fashion. Instead of the zigzag arrangement, the slits can be formed in such a way that they all have the same length and arranged side by side at certain spaced intervals so as to form rows of such slits, these rows of slits being arranged at predetermined spaced intervals.

The core member 1 having the construction described above can also be produced using an electrolytic deposition method which will be described later. In this case, the fabrication of the band-like metal sheet 3 and the formation of the bowed portions 4 and 7 in the metal sheet 3 are achieved by one continuous operation; the core member can therefore be produced with an even higher throughput and at lower cost.

Electrode plates constructed with such core member 1 possess a large contact area with the active material 2 because of the first and second bowed portions 4 and 7 protruding alternately on the front and back sides of the metal sheet 3, these bowed portions 4 and 7 acting as current collectors of the active material 2. As a result, a high degree of utilization of the active material 2 is achieved. The current collecting properties are particularly increased in the widthwise direction of the metal sheet 3, thus increasing the current collecting efficiency, which in turn improves the discharge characteristics of the electrode plates. Moreover, the electrode plate will exhibit an extremely high active material-retaining capability because of the active material layer 6 being embraced by the first and second bowed portions 4 and 7 from upper and lower sides of the metal sheet 3. Therefore, even if the electrode plates are formed into a spiral electrode assembly, the peeling of active materials 2 from the electrode plates is reliably prevented. Also, the amount of active material 2 per unit volume is increased without causing a decrease in the utilization of the active material 2. Thus the large current discharge characteristics per unit volume of a resultant battery are greatly improved as compared to those of prior art batteries that use two-dimensional core members.

Moreover, since the core member 1 is fabricated by providing parallel slits in a single metal sheet 3 and by forming, by plastic deformation, the pieces of strip between the slits into bowed portions 4 and 7 so that they protrude on both front and back sides of the metal sheet, the core member 1 is free from burrs, and therefore there is no risk of inner short circuits. Also, because the core member 1 is obtained through plastic deformation of relatively thin metal sheet 3, the ratio by volume of core member to active material 2 is decreased, whereby a higher energy density is achieved in resultant batteries. Furthermore, the core member 1 includes generally oval spaces (when viewed from a side) which are formed between the first and second bowed portions 4 and 7 protruding alternately on both front and back sides of the metal sheet 3. When a battery is constructed using the core member, these spaces enable a smooth flow of ions and gas resulting from electrolyte and reactions inside the battery. The battery will thus have a higher current collecting efficiency than a battery with electrode plates that are two-dimensionally coated with active material, and is capable of producing a large electric current.

The battery electrode plates further have the following merits: the core member 1 is formed with plain parts 5 along the edges of its lengthwise direction, which increases its strength against tension in this direction. Thus unwanted deformation during a rolling process is prevented, while welding of current collector plates and leads is carried out efficiently and reliably. The plain parts 5 are corrugated by forming grooves 15 (or ridges) therein as shown in FIG. 3, so as to absorb any wrinkles or deformation in the plain parts 5 when forming the bowed portions 4 and 7. The strength of the plain parts 5 is also thereby enhanced, and therefore the plain parts 5 will not be bent or deformed when welding current collectors (to be described later) to the plain parts 5. The grooves 15 also allow for stretching of the plain parts 5 which occurs with the stretching of the bowed portions 4 and 7 during a rolling process after coating the active material 2 on the core member. The plain parts 5 have a larger thickness d2 than the thickness d1 of the bowed portions 4 and 7 and flat parts 9. This enables large pressure to be applied on the plain parts 5 to which welding will be performed when bonding it to a current collector by, for example, resistance welding. The plain parts thus contribute to an enhanced welding efficiency and enable reliable bonds to be formed.

The battery electrode plates further have the following merits: the strips of bowed portions 4 and 7 are formed such that their lengthwise direction matches the lengthwise direction Y of the core member 1. Since the mixture paste is coated on the core member 1 along the direction of length of the core member 1, there is no risk of an application slit or die lips being caught in the bowed portions 4 and 7. Further, the core member 1 is entirely embedded in the active material layer 6.

When compared particularly to an electrode plate that uses a foamed, porous metal substrate as core member, which is currently considered to be most excellent in resultant battery performance, the electrode plate (of this invention) offers the major advantages that it can be produced at lower cost, that it facilitates the bonding of current collectors because of the plain parts 5 that are readily provided, and that it can be made thinner.

The metal sheet for the battery electrode plate, before forming the bowed portions therein, is preferably made of foil including any of nickel, copper, aluminum, iron, and an alloy chiefly including any of these metals, or made of nickel-plated iron or copper, or copper-plated iron. Low-cost, high-strength metal sheet can be obtained from these materials.

Figure 4:
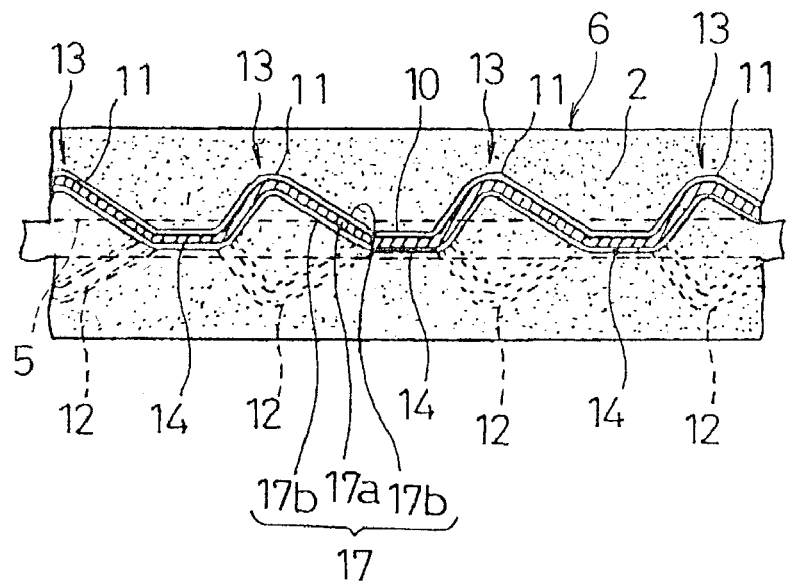
FIG. 4 is a longitudinal cross-section illustrating a battery electrode plate according to a second embodiment of the invention.

FIG. 4 is a longitudinal cross-section illustrating a battery electrode plate according to a second embodiment of the present invention. Similarly to the first embodiment, the battery electrode plate is constructed such that a core member 10 is densely coated with a mixture paste that includes chiefly an active material 2 of either positive electrode or negative electrode, thereby forming an active material layer 6 on both sides of the core member 10. The core member 10 is formed with first bowed portions 11 and second bowed portions 12 arranged parallel to each other along one direction and alternately protruding on the front and back sides of the core member 10. A plurality of rows 13 of such bowed portions are arranged along a direction that is orthogonal to the above direction (in which the bowed portions are arranged), with flat parts 14 of a predetermined width interposed between each two rows.

The core member 10 differs from the core member 1 of the first embodiment in that, instead of the metal sheet 3, a rolled nickel-plated foil 17 is employed, which includes a metal foil 17a formed with nickel plates 17b on both sides thereof to provide rough surfaces. In addition to all the advantages described with regard to the first embodiment, the core member 10 exhibits an even better active material-retaining capability, because the rolled nickel-plated foil 17 has rougher surfaces than the metal sheet 3.

The core member for the battery electrode plate should preferably have plain parts (where no bowed portions are formed) along the edges of the core member, parallel to its lengthwise direction. This will enhance the strength of the core member against tension in the lengthwise direction, and thereby deformation of core member during a rolling process is prevented. Also, because such plain parts have lower active material-retaining property than the parts formed with the bowed portions, they allow the active material that has been applied onto the core member to be readily removed, whereby the welding of current collector plates or leads is efficiently and reliably carried out.

The plain parts mentioned above should preferably have a larger thickness than the bowed portions and flat parts. This enables large pressure to be applied on the plain parts, to which welding will be performed when bonding it to a current collector by, for example, resistance welding. The plain parts thus contribute to an enhanced welding efficiency and enable reliable bonds to be formed. The plain parts are preferably corrugated by forming grooves or ridges therein, so as to absorb any wrinkles or deformation in the plain parts when forming the bowed portions. The strength of the plain parts is also thereby enhanced, and therefore the plain parts will not be bent or deformed when welding current collectors to the plain parts. Such corrugation also allows for stretching of the plain parts which occurs with the stretching of the bowed portions during a rolling process after coating the active material on the core member.

Moreover, the bowed portions in the above battery electrode plate should preferably be formed such that their lengthwise direction matches the lengthwise direction of the core member. Since the mixture paste is coated on the core member along the direction of length of the core member, there is no risk of an application slit or die lips being caught in the bowed portions.

Further, the core member of the above battery electrode plate should preferably be embedded entirely in the active material layer which is formed by applying a mixture paste on both sides of the core member, the mixture paste including an active material, a conductive agent, and a binder. The electrode plate will thereby have no parts on its surface where metal is exposed; thus short circuits are prevented.

Figure 5:
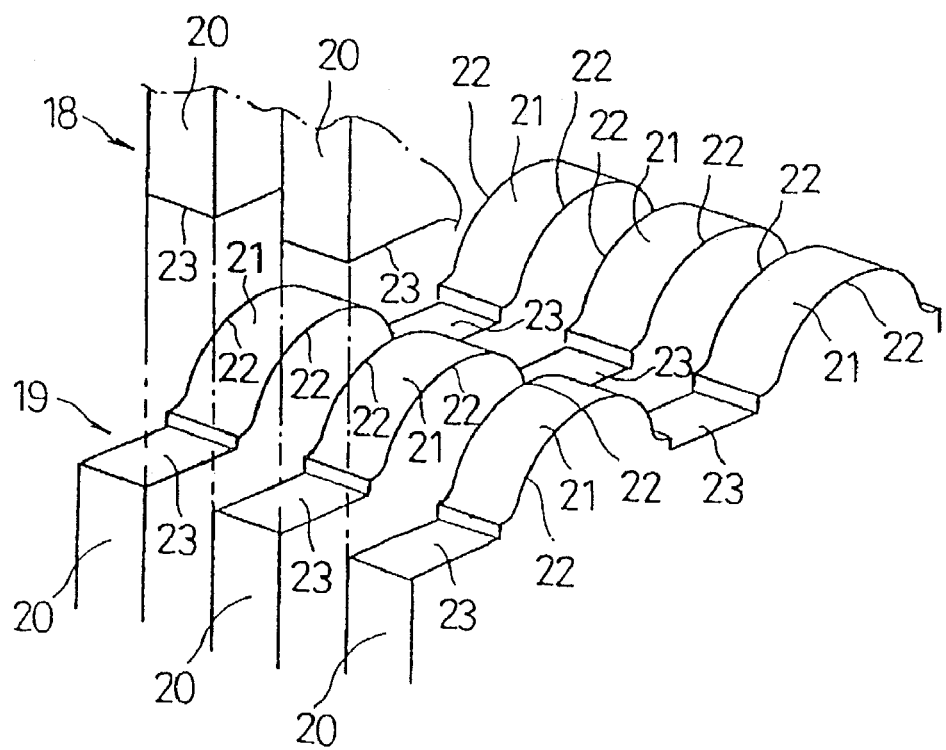
FIG. 5 is a perspective view illustrating major parts of an apparatus for producing the core member according to a reciprocating method.

Next, a method of producing the core member 1 for the battery electrode plate of the first embodiment will be described. FIG. 5 is a perspective view illustrating major parts of a producing apparatus according to a reciprocating type continuous press method. The apparatus includes an upper die 18 and a lower die 19, each of which constitutes shearing cutters that are made up of a plurality of plate cutters 20 arranged side by side at certain spaced intervals which correspond to the thickness of the plate cutters. Each of the plate cutters 20 is formed with generally semi-circular bumps 21 at predetermined pitch spaces. Either end of each bump 21 forms the blades 22 of the shearing cutters for cutting the metal sheet 3. Between each two adjacent bumps 21, 21 on each plate cutter 20 are formed flat non-processing parts 23.

FIG. 5 mainly shows the structure of the lower die 19. The upper die 18 has the same structure as that of the lower die 19 but is arranged upside down and opposite the lower die 19 so that their equally spaced plate cutters 20 will interengage each other. When the upper die 18 and the lower die 19 are driven in mutually approaching directions, the plate cutters 20 of the upper die 18 will slide into the spaces between each two adjacent plate cutters 20 of the lower die 19 and onto a side face of the outermost plate cutter 20 of the lower die 19.

The metal sheet 3 that will form the core member 1 is in the form of a band, and fed intermittently into between the upper die 18 and the lower die 19. The upper die 18 and the lower die 19 are driven to advance in such directions that they will be in close proximity to each other, immediately after the intermittently fed metal sheet 3 has been brought to and paused at a predetermined position. The respective plate cutters 20 of the upper die 18 and of the lower die 19 then interengage each other, thus forming slits 24 and bowed portions 4 and 7 in the metal sheet 3 fed therebetween, as shown in FIG. 6B. Thereafter, the upper die 18 and the lower die 19 are driven in retreating directions to move apart from each other, the metal sheet 3 is then fed by a predetermined pitch, and afterwards the same actions as described above are repeated.

Figure 6A:
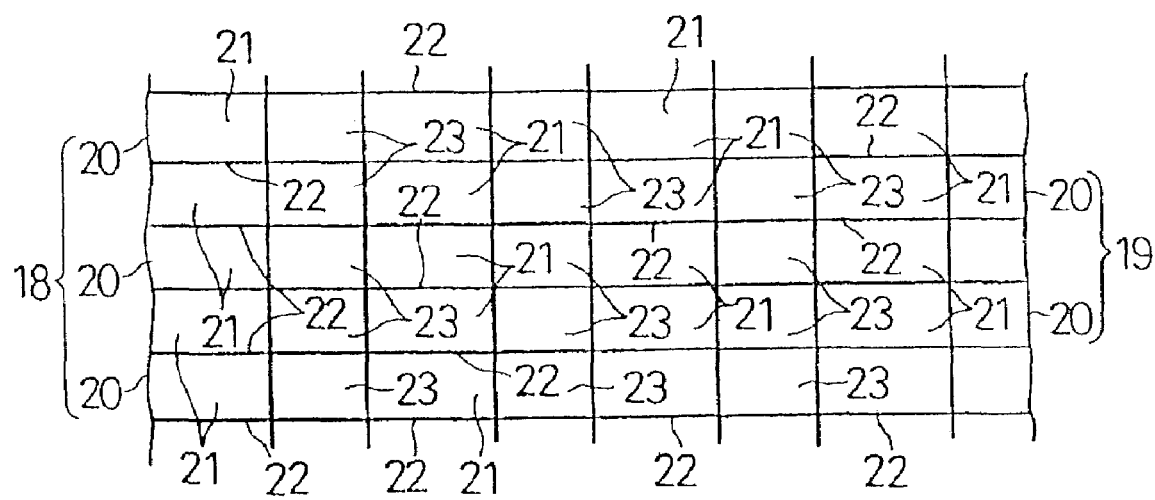
FIG. 6A is a diagrammatic plan view of an upper die and a lower die interengaged with each other in the apparatus.
Figure 6B:
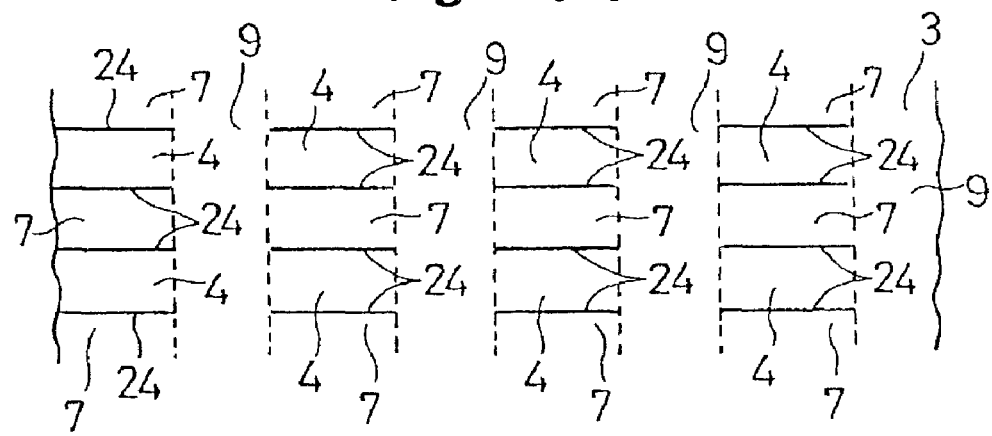
FIG. 6B is a diagrammatic plan view of slits and bowed portions formed in the metal sheet by the interengaging upper die and the lower die.

FIG. 6A is a diagrammatic plan view of the upper die 18 and the lower die 19 interengaged with each other, and FIG. 6B is a diagrammatic plan view of slits 24 and bowed portions 4 and 7 formed in the metal sheet 3 by the interengaging upper die 18 and the lower die 19. As shown, the metal sheet 3 is incised with slits 24 where the respective blades 22, 22 of the upper die 18 and the lower die 19 meet each other and approximately at the same time the strips between each two adjacent slits 24, 24 are either pushed up by the bumps 21 on the lower die 19 or pushed down by the bumps 21 on the upper die 18, thus forming the first bowed portions 4 and the second bowed portions 7, respectively. At this time, the flat parts 9 are also provided in the metal sheet where the upper and lower non-processing parts 23 meet each other. The core member 1 shown in FIG. 3 is thus obtained. Japanese Patent Laid-Open Publication No. Hei. 11-260373 proposes a method of producing an expanded mesh sheet, in which a number of slits are formed in a sheet along its lengthwise direction intermittently in a zigzag fashion. Unlike such zigzag arrangement, the slits 24 described above are all of the same length and arranged side by side at certain spaced intervals so as to form parallel, equally spaced rows of such slits.

According to this method of producing the core member 1, the metal sheet 3 is fed in band form between the opposing upper die 18 and the lower die 19, which are each made up of a number of plate cutters 20 arranged at certain spaced intervals and which are driven to move back and forth, and thereby a plurality of rows of slits 24 and bowed portions 4 and 7 are all formed at one time. Since the method allows the core member 1 to be produced through very simple process steps, it enables mass-production of low-cost core members 1 with high throughput. Moreover, the thickness of the plate cutters 20 can be reduced to a minimum up to its processing limit of 100 μm so as to form extremely fine slits 24 and to form the first and second bowed portions 4 and 7 at a very fine pitch. This will contribute to the fabrication of battery electrode plates suitable for constructing small high-performance batteries.

Figure 7:
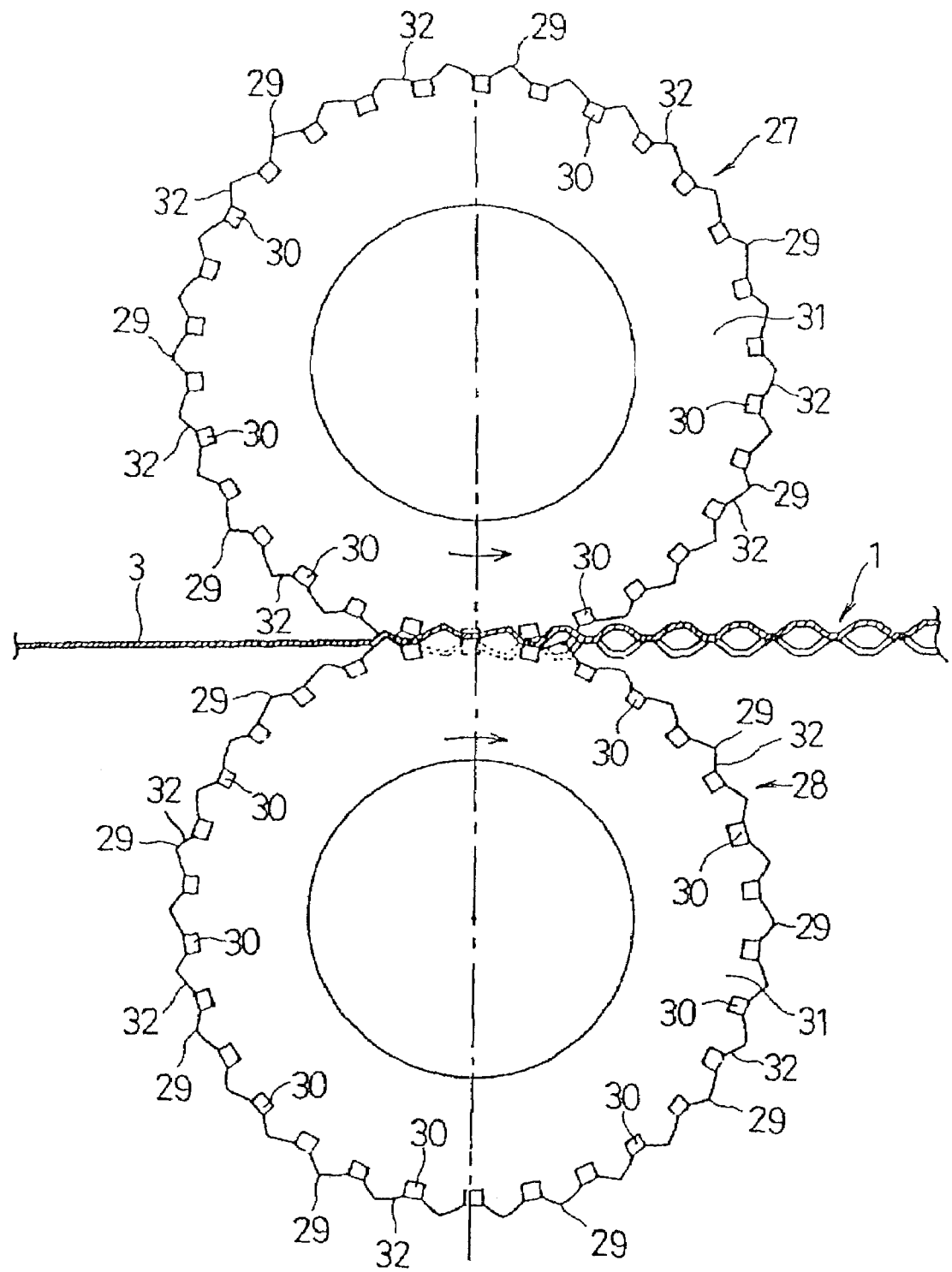
FIG. 7 is a side view illustrating major parts of an apparatus for producing the core member according to a rotary method.

FIG. 7 is a side view showing major parts of an apparatus for producing the core member 1 of the battery electrode plate of the first embodiment according to another method, which adopts a rotary type molding method to enable a continuous production of core members 1. The apparatus includes a pair of upper and lower processing rolls 27 and 28 opposite each other with an interval that corresponds to the thickness of the metal sheet 3 between the rolls. The upper and lower processing rolls 27 and 28 each include a predetermined number of disk cutters 31, each of the disk cutters being formed with a plurality of bumps 29 circumferentially arranged at predetermined pitch spaces, blades 32 at either end of each of the bumps 29, and non-processing parts 30 between each two adjacent bumps 29. These disk cutters 31 are arranged side by side in a direction of from front to rear of the drawing with intervals that match the thickness of each disk cutter and in an arrangement in which the bumps 29 on all the disk cutters are aligned in line with each other. The upper and lower rolls 27 and 28 are arranged opposite each other in such relative positions that they are shifted from each other in the direction of from front to rear of the drawing so that the disk cutters 31 of one roll will enter between two adjacent disk cutters 31, 31 of the other roll.

In operation, both processing rolls 27 and 28 are rotated in sync with each other, while the metal sheet 3 in band form is continuously fed toward between the processing rolls 27, 28. Thereby, the metal sheet 3 is incised with slits 24 where the blades 32, 32 of the disk cutters 31, 31 of the upper processing roll 27 and the lower processing roll 28 meet each other and approximately at the same time the strips between each two adjacent slits 24 are either pushed up by the bumps 29 on the lower processing roll 28 or pushed down by the bumps 29 on the upper processing roll 27, thus forming the first bowed portions 4 and the second bowed portions 7, respectively. At this time, the flat parts 9 are also provided in the metal sheet where the upper and lower non-processing parts 30, 30 meet each other. The core member 1 shown in FIG. 3 is thus obtained.

This rotary type method using upper and lower processing rolls 27 and 28 enables a consecutive processing of the core member 1 as the metal sheet 3 is continuously fed, and therefore the productivity is higher because of the higher processing speed as compared to the reciprocating type method of FIG. 5, in which the metal sheet 3 is fed intermittently. One drawback of this rotary type method is that the disk cutters 31 are subject to a limitation on the reduction of their thickness, resulting in slightly larger pitch spaces of the bowed portions 4 and 7 as compared to the reciprocating type method described above.

Figure 8:
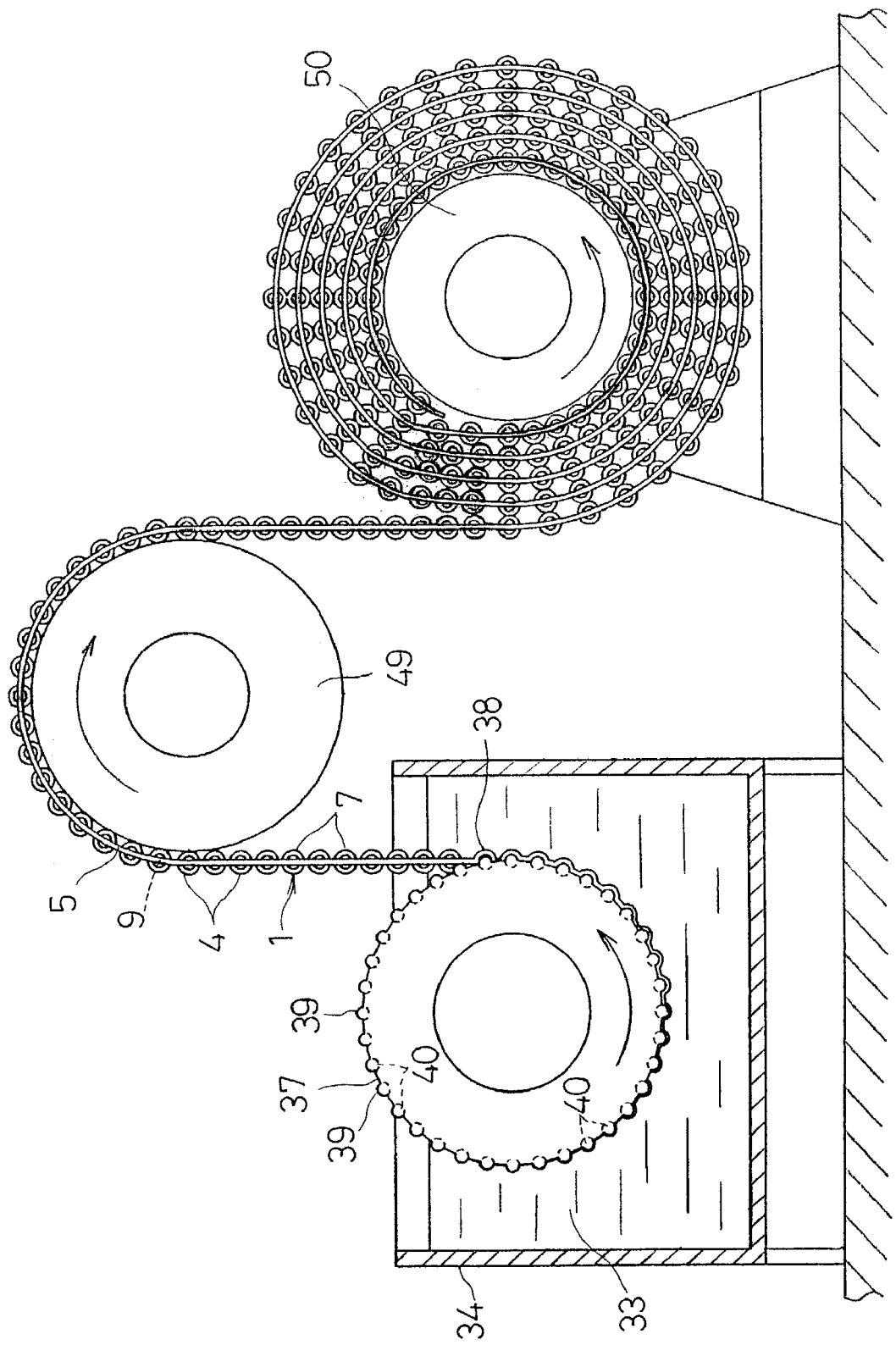
FIG. 8 is a partly broken side view of an apparatus for producing the core member according to an electrolytic deposition method.

FIG. 8 is a cross-sectional side view of an apparatus for producing the core member 1 for the battery electrode plate of the first embodiment according to yet another method. With this method, the metal sheet 3 is continuously produced by electrolytic deposition, and at the same time the metal sheet 3 is formed with all of the bowed portions 4 and 7, flat parts 9, and plain parts 5 at one time. In other words, according to this method, the core member 1 made of metal sheet 3 is obtained in band form with all the bowed portions 4 and 7, flat parts 9, and plain parts 5 already formed therein.

The apparatus includes a roll-like electrolytic deposition drum 37, an electrolyzer (electroplating tank) 34 filled with electrolyte (plate bath) 33, the drum being positioned inside the electrolyzer 34 so as to be immersed in the electrolyte. The drum 37 is continuously rotated in one predetermined direction of the arrow at a predetermined rate. Thus electrolytic deposition takes place continuously at the drum 37 which constitutes a cathode, with the electrolyzer 34 acting as the anode, whereby nickel electrolyzed from the electrolyte 33 is deposited on the circumferential surface of the drum 37 as it rotates. The electrolytic nickel gradually builds up on the drum, eventually forming foil 38 of a predetermined thickness.

Figure 9:
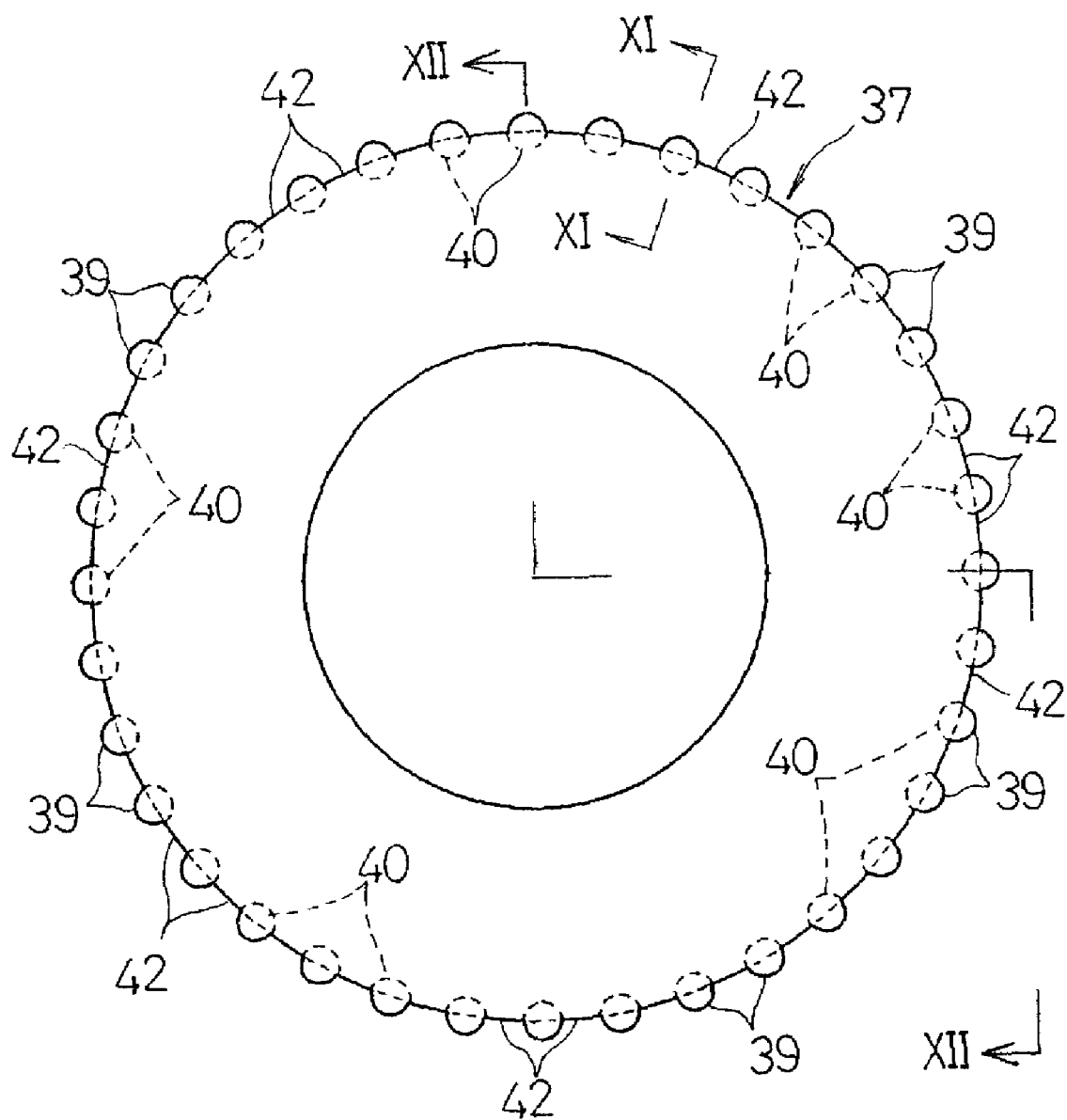
FIG. 9 is an enlarged side view illustrating an electrolytic deposition drum in the apparatus.
Figure 10:
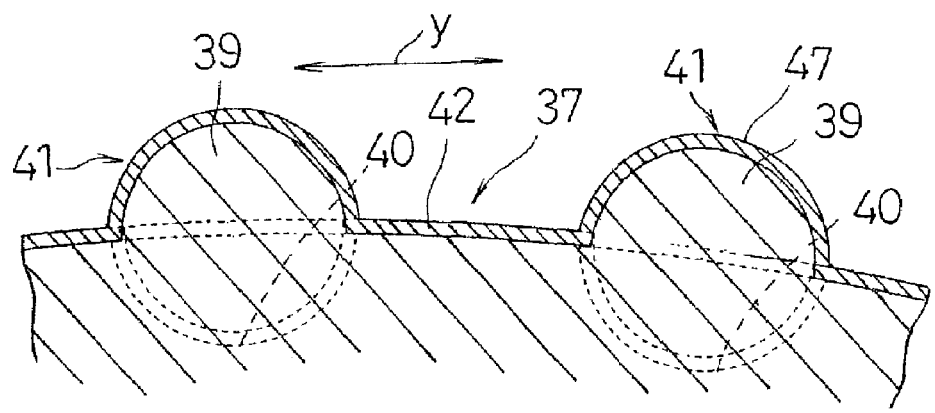
FIG. 10 is an enlarged cross-sectional side view of a part of the electrolytic deposition drum.
Figure 11:
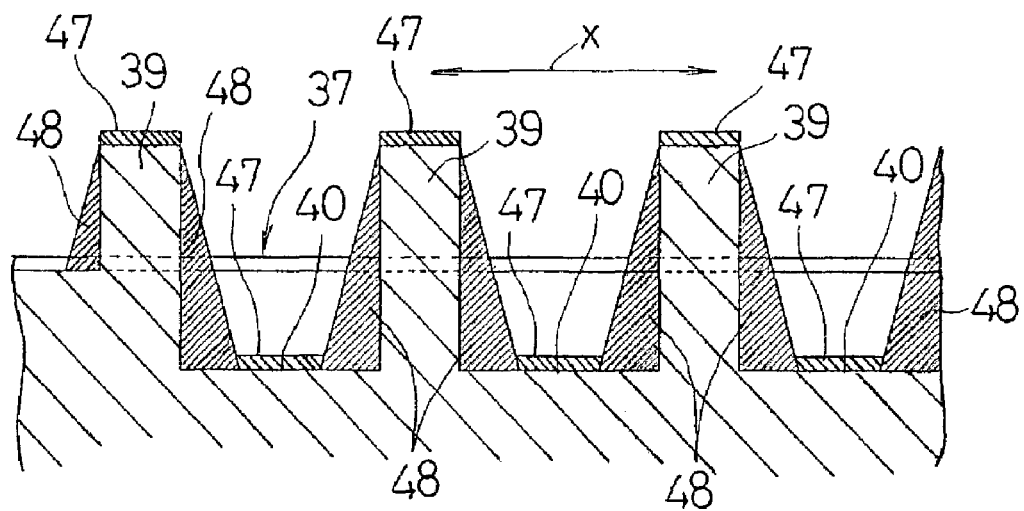
FIG. 11 is an enlarged cross-section cut across the line XI—XI of FIG. 9.
Figure 12:
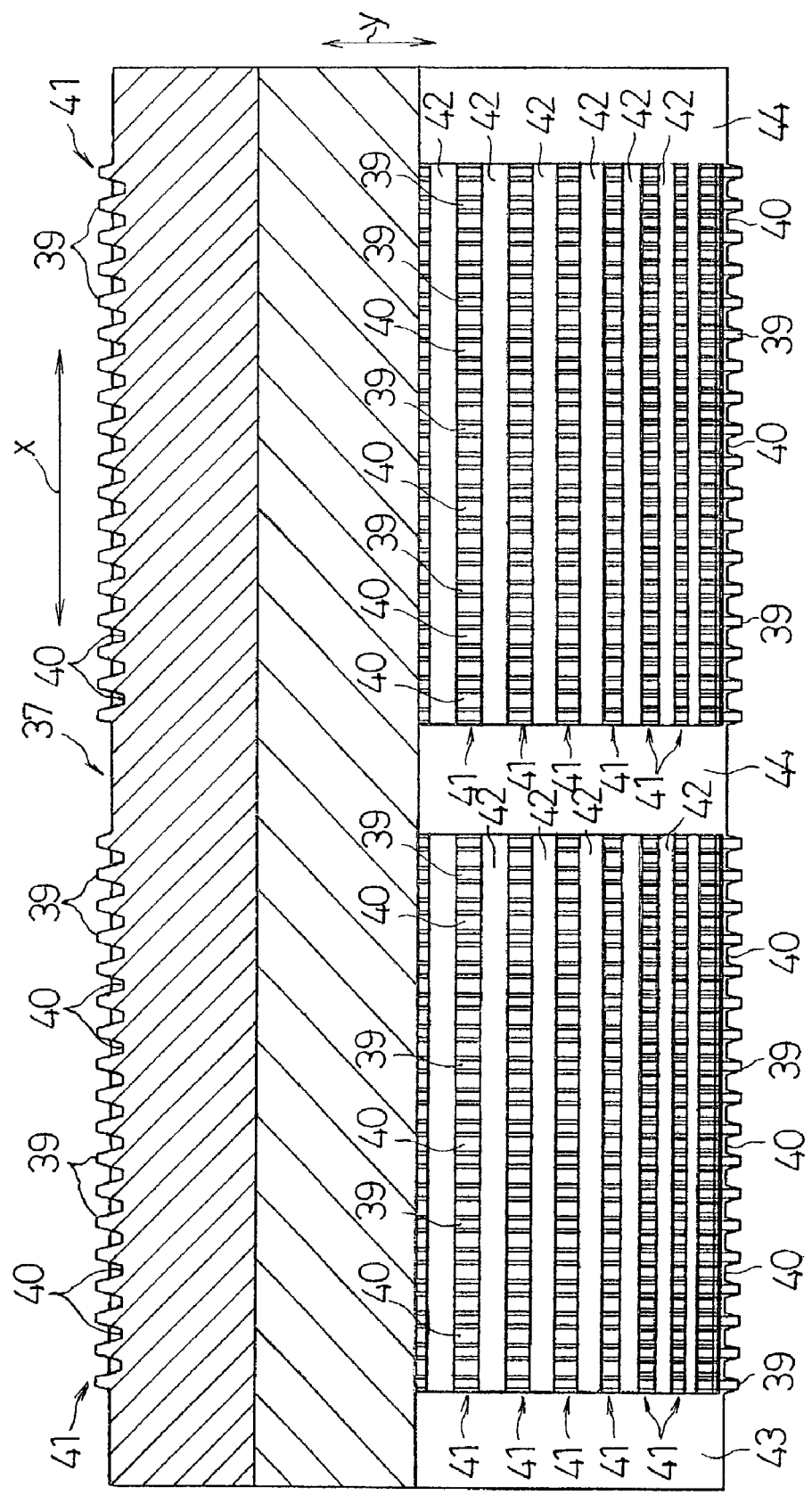
FIG. 12 is a cross-section cut across the line XII—XII of FIG. 9.

FIG. 9 to FIG. 12 all show the electrolytic deposition drum 37. FIG. 9 is an enlarged side view, FIG. 10 is a cross-sectional side view of a part of it, FIG. 11 is an enlarged cross-section cut across the line XI—XI of FIG. 9, and FIG. 12 is a cross-section cut across the line XII—XII of FIG. 9. The electrolytic deposition drum 37 is formed on its circumferential surface with curved bumps 39 and curved dents 40 that are arranged alternately side by side in the axial direction x, and these rows 41 of bumps and dents are arranged along the circumferential direction y with flat parts 42 of a predetermined width interposed between each two rows. The electrolytic deposition drum 37 further has plain parts 43 and 44 at either axial end and in the middle part thereof, parallel to its circumferential direction y, where no curved bumps 39 or dents 40 are formed, as shown in FIG. 12. Moreover, as shown in FIG. 10 and FIG. 11, the entire circumferential surface of the drum 37, i.e. the surfaces of the curved bumps 39, curved dents 40, flat parts 42, and plain parts 43 and 44 are all covered with metal (in this case titanium) coating 47. At the boundary between the curved bumps 39 and curved dents 40 are electrically insulating partitions 48 that connect the lateral sides of the bumps and dents and extend generally in a diametral direction. Because of these partitions 48, a core member having the first and second bowed portions and flat parts of certain width is continuously produced with high precision.

The electrolytic deposition takes place continuously in the electrolyzer 34, with itself acting as anode and the drum 37 as cathode. Electrolytic metal such as nickel is electrolyzed from the electrolyte 33 and deposited evenly and gradually on the entire surface of the metal coating 47 on the circumferential surface of the drum 37. By the time the electrolytic deposition drum 37, which is continuously rotated at a fixed rate, has nearly made a turn, the electrolytic metal will have built up on the circumferential surface of the drum 37 to a thickness of from 20 $\mu$m to 30 $\mu$m, thus forming metal foil 38. The foil 38, when it has developed to a certain thickness, is peeled off and taken out from the electrolyzer 34, and is taken up as the core member 1 on a take-up drum 50 via an intermediate guide roller 49. The metal coating 47 includes titanium, which can hardly be alloyed with any electrolytic metal, permits easy removal of the deposited foil 38.

The core member 1 taken up on the take-up drum 50 has the same configuration as the core member 1 of the first embodiment shown in FIG. 3. That is, the core member 1 includes the strips of first and second bowed portions 4 and 7 that protrude alternately on both front and back sides of the metal foil 38 along the axial direction x, each of the bowed portions being formed by the curved bumps 39 and curved dents 40, respectively. Because of the partitions 48 made of electrically insulating material, spaces that are generally oval when viewed from a side are formed between each adjacent first and second bowed portions 4 and 7. A plurality of rows 8 of the alternately arranged first and second bowed portions 4 and 7 are arranged along the circumferential direction y, with the flat parts 9 of a predetermined width interposed between each two rows, these flat parts being formed by the flat parts 42 on the drum. Further, the plain parts 5 are formed by the corresponding plain parts 43 on the drum. Thus the core member is produced precisely into the same shape as the core member 1 of the first embodiment. In this apparatus, as is clear from the shape of the electrolytic deposition drum 37 shown in FIG. 8, a pair of core members 1 are produced at the same time in parallel with each other, i.e., they are cut along the center line of the plain part 44 in the middle of the foil into separate pieces of core members 1, after the foil is taken up on the take-up drum 50.

This electrolytic deposition method not only possesses all the advantages of the above-described reciprocating or rotary type method, but also it makes possible to form a band-like foil 38 which will constitute the metal sheet and to provide this foil 38 with the bowed portions 4 and 7, flat parts 9 and plain parts 44 simultaneously and continuously. Thus the productivity is much enhanced with this method, the cost further reduced, and furthermore, core member 1 that is even thinner is readily produced, as compared to the reciprocating or rotary type method. Moreover, after the formation of core member 1 by the electrolytic deposition, the core member 1 may enter a plate bath so as to cause electrolytic deposition to take place on its roller side. Thereby, the core member 1 is readily given rough surfaces to exhibit an even better active material-retaining capability.

In any of the above-described producing methods, it is preferable to conduct a rough finishing treatment to the core member before, after, or during it is processed, by any one of electrolytic deposition, etching, sandblast, roll transfer, metal spraying, and powder sintering techniques. The surface of the metal sheet for the core member can be made rough by any of these methods. More specifically, the electrolytic deposition method will produce core members having minute bosses, while the etching method or sandblast method will form minute pits on the surface of the core members. The roll transfer method will form minute bosses on the surface of the core members. By the metal spraying method, metal particles are bonded on the surface of the core members, thus forming bosses thereon. With the powder sintering method, in which the shape or the element of the metal being used is altered, it is even possible to control the condition of rough surfaces and also the current collecting properties of the resultant core member, while performing the rough surface treatment to the metal sheet.

Figure 13:
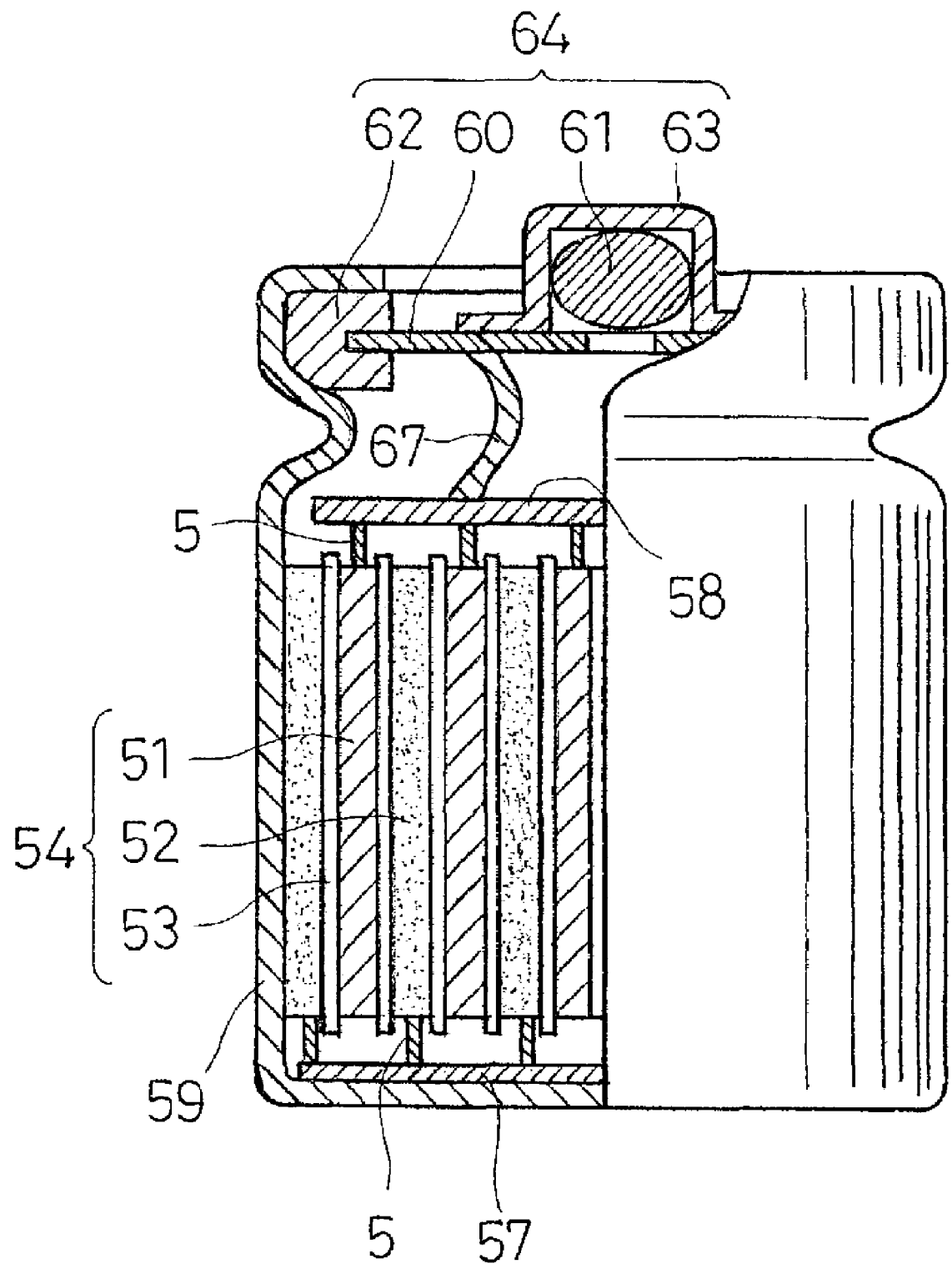
FIG. 13 is a partly broken front view of a battery constructed using the battery electrode plate.

FIG. 13 is a partly broken front view of a nickel metal hydride rechargeable battery that is constructed using the battery electrode plate of the first embodiment. The battery includes a spiral electrode plate assembly 54 which is obtained by superposing a positive electrode plate 51, a negative electrode plate 52, and a separator 53 interposed therebetween, and rolling them all together. The positive electrode plate 51 is constructed by coating the core member 1 of FIG. 3 with a positive electrode mixture paste that chiefly includes nickel hydroxide powder. The negative electrode plate 52 is constructed by coating the core member 1 of FIG. 2 with a negative electrode mixture paste that chiefly includes hydrogen-absorption alloy powder.

Next, specific examples of positive and negative electrodes 51 and 52 in the above battery will be described. The core member 1 has a thickness d1 (see FIG. 1) of about 20 $\mu$m in portions where the bowed portions 4 and 7 and flat parts 9 are formed. The thickness d2 (see FIG. 1) of the plain parts 5 is about 30 to 40 $\mu$m, and a multiplicity of grooves 15 shown in FIG. 3 are formed parallel to each other in the plain parts 5. The top-to-top distance d3 (see FIG. 1) between the first and a second bowed portions 4 and 7 is about 0.35 mm. This distance d3 between the tops of the first and second bowed portions 4 and 7 decreases to about 0.30 mm after the active material coating process and the rolling process thereafter.

The positive electrode plate 51 was constructed by applying a positive electrode mixture paste on both sides of the core member 1, thus forming the active material layer 6 shown in FIG. 1. The positive electrode mixture paste was obtained to have a moisture rate of from 17 to 19% by mixing and kneading powders of nickel hydroxide, cobalt hydroxide, a binder including carboxymethylcellulose (CMC) and polytetrafluoroethylene (PTFE), and water. The core member 1 was coated on its both sides with this positive electrode mixture paste to the thickness of 0.65 mm to form the active material layer 6. After drying the active material layer 6, the core member 1 was rolled to the thickness of 0.45 mm, and then cut into strips of positive electrodes 51 which will have the capacity of 3000 mAh, each being 390 mm in length and 35 mm in width (including the 1 mm wide plain part 5).

The negative electrode plate 52 was constructed by applying a negative electrode mixture paste on both sides of a punched metal substrate, thus forming the active material layer 6. The negative electrode mixture paste was obtained by mixing and kneading powders of a hydrogen-absorption alloy having known compositions, carbon black as a conductive agent, styrene butadiene rubber (SBR), PTFE, and CMC as a binder, and water. The core member 1 was coated on its both sides with this negative electrode mixture paste to the thickness of 0.42 mm to form the active material layer 6. After drying the active material layer 6, the core member was rolled to the thickness of 0.22 mm, and then cut into strips of negative electrodes 52 which will have the capacity of 4800 mAh, each being 440 mm in length and 35 mm in width (including the 1 mm wide plain part 5).

When rolled into the spiral electrode plate assembly 54, the plain part 5 of the negative electrode plate 52 projects on one side thereof, and the plain part 5 of the positive electrode plate 51 projects on the other side thereof. To the respective end faces of these projecting plain parts 5 are bonded a negative electrode current collector 57 and a positive electrode current collector 58 by resistance welding. The spiral electrode plate assembly 54 with both current collectors 57 and 58 bonded thereto is accommodated in a battery case 59, which is then filled with liquid electrolyte (not shown). At the opening end of the battery case 59 is inserted a seal assembly 64, which includes a sealing plate 60, a safety vent structure 61, an insulating gasket 62, and a metallic cap 63. The periphery of the open end of the battery case 59 is then bent inwards to provide a tight seal. The negative electrode current collector 57 is bonded to the bottom of the battery case 59 by welding, while the positive electrode current collector 58 is electrically connected to the sealing plate 60 through a positive electrode lead 67. A nickel hydride rechargeable battery of sub-C type (slightly smaller than size C) and of 3000 mAh capacity is thus obtained.

The core member 1 used for the positive electrode plate 51 in this nickel hydride rechargeable battery is produced at lower cost, is readily provided with the plain parts 5, and is readily made thinner, as compared to conventional foamed porous metal substrates. The lower cost for fabricating the core member 1 reflects as a reduction in the overall costs. The provision of the plain parts 5 at an initial stage, which are conveniently bonded to the positive electrode current collector 58 by welding, enables the simplification of the battery structure and the enhancement of the current collecting characteristics. The core member 1 thus contributes to a higher current collecting efficiency, which in turn improves the discharge characteristics of the battery. Further, the thinner core member leads to a higher energy density of the battery, and contributes to the generation of a large electric current, because the electric resistance is reduced to a minimum. Moreover, the core members 1 used for both positive and negative electrode plates 51 and 52 of this nickel hydride rechargeable battery boast an excellent active material- retaining capability; therefore troubles caused by the peeling of active material 2 are prevented, whereby a trouble-free life of the battery is ensured. The application of the second embodiment shown in FIG. 3 is also suitable for constructing the spiral electrode plate assembly 54, as the positive and negative electrode plates 51 and 52 will exhibit an even higher active material-retaining capability.

The above electrode plates are free from burrs on their surfaces, which means the separator can be made thinner. Thereby a higher energy density of the battery can be achieved. The above electrode plates can be applied to any type of various battery systems with the same advantages described above. If applied to alkaline rechargeable batteries, they will specifically be effective to achieve enhanced large current discharge performance, which is much desired in this type of batteries. They can also be applied to non-aqueous electrolyte lithium rechargeable batteries to improve the discharge characteristics.

INDUSTRIAL APPLICABILITY

As described above, the battery electrode plate of the present invention enables a high degree of active material utilization and exhibits high active material-retaining capability. A battery using this electrode plate possesses greatly improved discharge characteristics and particularly excellent large current discharge characteristics per unit volume. The electrode plate eliminates any risk of inner short circuits, and its reduced volume ratio relative to active material leads to a higher energy density of the resultant battery. The method of producing battery electrode plates according to the present invention allows the core member of the electrode plate to be fabricated through simple process steps, and therefore it enables mass-production of such electrode plates. Thus the battery electrode plate and the producing method thereof according to the present invention are particularly useful in enhancing battery performance and in realizing low-cost mass-production of batteries.

What is claimed is:
1. A battery electrode plate comprising:
a core member that is densely coated with a mixture paste chiefly including an active material, wherein:
the core member is made of a metal sheet, the metal sheet being made of any one selected from the group consisting of nickel, copper, aluminum, iron, and an alloy chiefly comprising any of these metals;
the metal sheet being formed with a plurality of strips;
said strips comprising first and second bowed portions alternately protruding on the front and back sides of the metal sheet along one direction (X) of the metal sheet, each bowed portion in said one direction directly contacting each adjacent bowed portion in said one direction;
said strips forming a plurality of protruding rows, the protruding rows being arranged along a direction (Y) orthogonal to the direction (X) with flat parts of a predetermined width interposed between each two protruding rows;

said (Y) direction defining a length of said electrode plate, said electrode plate having first and second opposing lengthwise edges, each of said edges comprising a plain part, said plain part extending along the entire length of said electrode plate; and wherein a plain part in the core member is corrugated by forming grooves or ridges therein.

2. A battery electrode plate comprising:

a core member that is densely coated with a mixture paste chiefly including an active material, wherein:

the core member is made of a metal sheet, the metal sheet being made of any one selected from the group consisting of nickel-plated iron, nickel-plated copper, and copper-plated iron;

the metal sheet being formed with a plurality of strips;

said strips comprising first and second bowed portions alternately protruding on the front and back sides of the metal sheet along one direction (X) of the metal sheet, each bowed portion in said one direction directly contacting each adjacent bowed portion in said one direction;

said strips farming a plurality of protruding rows, the protruding rows being arranged along a direction (Y) orthogonal to the direction (X) with flat parts of a predetermined width interposed between each two protruding rows;

said (Y) direction defining a length of said electrode plate, said electrode plate having first and second opposing lengthwise edges, each of said edges comprising a plain part, said plain part extending along the entire length of said electrode plate; and wherein a plain part in the core member is corrugated by forming grooves or ridges therein.

3. The battery electrode plate according to claim 1 or 2, wherein the core member is made of a metal sheet having rough finished surfaces.

4. The battery electrode plate according to claim 1 or 2, wherein the core member is formed with a plain part, where no bowed portions are formed, along a lengthwise side edge thereof parallel to the lengthwise direction of the core member.

5. The battery electrode plate according to claim 1 or 2, wherein a plain part in the core member has a larger thickness than the bowed portions and the flat parts.

6. The battery electrode plate according to claim 1 or 2, wherein the strips of bowed portions are formed in such an arrangement that the lengthwise direction of the strips matches the lengthwise direction of the core member.

7. The battery electrode plate according to claim 1 or 2, wherein the mixture paste comprises the active material, a conductive agent, and a binder, and the core member is coated on both sides thereof with the mixture paste so as to be entirely embedded in an active material layer thus formed.

8. A battery comprising a positive electrode plate, a negative electrode plate, at least one of which is constructed with the battery electrode plate according to claim 1 or 2, a separator interposed between the positive electrode plate and the negative electrode plate, the positive electrode plate, the separator, and the negative electrode either being rolled or superposed upon one another to form an electrode plate assembly, a liquid electrolyte, and a battery case in which the electrode plate assembly is accommodated together with the liquid electrolyte.

9. A battery comprising a positive electrode plate, a negative electrode plate, a separator interposed therebetween, the positive electrode, negative electrode, and separator either being rolled or superposed upon one another to form an electrode plate assembly, positive and negative electrode current collectors, a liquid electrolyte, and a battery case in which the electrode plate assembly and the liquid electrolyte are accommodated, wherein the positive and negative electrode places are constructed with the battery electrode plate according to claim 6, each of the positive and negative electrode plates having respective plain parts protruding on both sides of the electrode plate assembly, and each of the positive and negative electrode current collectors is electrically connected to end faces of the respective plain parts of the positive and negative electrode plates.

10. A battery comprising a positive electrode plate, a negative electrode plate, a separator interposed therebetween, the positive electrode, negative electrode, and separator either being rolled or superposed upon one another to form an electrode plate assembly, positive and negative electrode current collectors, a liquid electrolyte, and a battery case in which the electrode plate assembly and the liquid electrolyte are accommodated, wherein the positive and negative electrode plates are constructed with the battery electrode plate according to claim 2, each of the positive and negative electrode plates having respective plain parts protruding on both sides of the electrode plate assembly, and each of the positive and negative electrode current collectors is electrically connected to end faces of the respective plain parts of the positive and negative electrode plates.

11. A battery comprising a positive electrode plate, a negative electrode plate, a separator interposed therebetween, the positive electrode, negative electrode, and separator either being rolled or superposed upon one another to form an electrode plate assembly, positive and negative electrode current collectors, a liquid electrolyte, and a battery case in which the electrode plate assembly and the liquid electrolyte are accommodated, wherein the positive and negative electrode plates are constructed with the battery electrode plate according to claim 3, each of the positive and negative electrode plates having respective plain parts protruding on both sides of the electrode plate assembly, and each of the positive and negative electrode current collectors is electrically connected to end faces of the respective plain parts of the positive and negative electrode plates.

12. A method for producing a battery electrode plate, comprising:

intermittently feeding a band-like metal sheet into between an upper die and a lower die that are driven in mutually approaching and retreating directions, the metal sheet being made of any one selected from the group consisting of nickel, copper, aluminum, iron, and an alloy chiefly comprising any of these metals;

forming a core member in such a manner that, when the upper die and the lower die are driven to advance to respective positions in proximity to each other, a plurality of slits are formed in the metal sheet at locations where respective blades of the upper die and the lower die interengage with each other, and at the same time strip-like portions formed between each adjacent slits are pushed up by a plurality of bumps on the lower die to form first bowed portions and pushed down by a plurality of bumps on the upper die to form second bowed portions in an alternate arrangement, the alternately arranged first and second bowed portions forming a plurality of protruding rows, and flat parts are formed between each two protruding rows at locations where respective non-processing parts of the upper die and the lower die interengage with each other;

densely coating the core member with a mixture paste chiefly comprising an active material; and wherein a plain part in the core member is corrugated by forming grooves or ridges therein.

13. A method for producing a battery electrode plate, comprising:

continuously feeding a band-like metal sheet into between a pair of processing rolls that are driven to rotate in synchronism with each other, the metal sheet being made of any one selected from the group consisting of nickel, copper, aluminum, iron, and an alloy chiefly comprising any of these metals;

forming a core member by:

forming a plurality of slits in the metal sheer at locations where respective blades of disk cutters of both the processing rolls interengage with each other; and forming, simultaneously with forming said slits, strip-like portions between each adjacent slit in one direction (X) of the metal sheet, said strip-like portions being pushed in opposite directions in an alternate arrangement by respective bumps on both the processing rolls to form first and second bowed portions, respectively, so that bowed portions in said one direction directly contact each adjacent bowed portion in said one direction;

the alternately arranged first and second bowed portions forming a plurality of protruding rows arranged along a direction (Y) orthogonal to the direction (X);

wherein said (Y) direction defines a length of said electrode plate, said electrode plate having first and second opposing lengthwise edges, and said step of forming a core member further comprises:

forming a plain pan on each of said lengthwise edges, said plain part extending along the entire length of said electrode place; and forming flat parts between each two protruding rows at locations where respective non-processing parts of both the processing rolls interengage with each other;

densely coating the core member with a mixture paste chiefly comprising an active material; and wherein a plain part in the core member is corrugated by forming grooves or ridges therein.

14. A method for producing a battery electrode plate, comprising:

rotating a metallic electrolytic deposition drum in one direction in an electrolyzer as being immersed in electrolyte therein, so that metal contained in the electrolyte is electrolyzed and continuously deposited on the circumferential surface of the electrolytic deposition drum, in which the electrolytic deposition drum has a plurality of rows of humps and dents on its circumferential surface arranged along its circumferential direction with flat parts interposed between each two rows, each of the rows comprising a plurality of curved bumps and curved dents alternately arranged along the axial direction of the electrolytic deposition drum;

peeling the metal deposited on the electrolytic deposition drum in the form of a foil to obtain a core member; and densely coating the core member with a mixture paste chiefly comprising an active material.

15. The method for producing a battery electrode plate according to claim 14, wherein the electrolytic deposition drum is covered entirely with titanium on its circumferential surface, and is formed with electrically insulating partitions extending in a diametral direction along the boundary of each two curved bumps and curved dents.

16. A method for producing a battery electrode plate, comprising:

intermittently feeding a band-like metal sheet into between an upper die and a lower die that are driven in mutually approaching and retreating directions, the metal sheet being made of any one selected from the group consisting of nickel-plated iron, nickel-plated copper, and copper-plated iron;

forming a core member in such a manner that, when the upper die and the lower die are driven to advance to respective positions in proximity to each other, a plurality of slits are formed in the metal sheet at locations where respective blades of the upper die and the lower die interengage with each other, and at the same time strip-like portions formed between each adjacent slits are pushed tip by a plurality of bumps on the lower die to form first bowed portions and pushed down by a plurality of bumps on the upper die to form second bowed portions in an alternate arrangement, the alternately arranged first and second bowed portions forming a plurality of protruding rows, and flat parts are formed between each two protruding rows at locations where respective non-processing parts of the upper die and the lower die interengage with each other;

densely coating the core member with a mixture paste chiefly comprising an active material; and wherein a plain part in the core member is corrugated by forming grooves or ridges therein.

17. A method for producing a battery electrode plate, comprising:

continuously feeding a band-like metal sheet into between a pair of processing rolls that are driven to rotate in synchronism with each other, the metal sheet being made of any one selected from the group consisting of nickel-plated iron, nickel-plated copper, and copper-plated iron, forming a core member by:

forming a plurality of slits in the metal sheet at locations where respective blades of disk cutters of both the processing rolls interengage with each other;

forming, simultaneously with forming said slits, strip-like portions between each adjacent slit in one direction (X) of the metal sheet, said strip-like portions being pushed in opposite directions in an alternate arrangement by respective bumps on both the processing rolls to form first and second bowed portions respectively, so that bowed portions in said one direction directly contact each adjacent bowed portion in said one direction;

the alternately arranged first and second bowed portions forming a plurality of protruding rows arranged along a direction (Y) orthogonal to the direction (X);

wherein said (Y) direction defines a length of said electrode plate, said electrode plate having first and second opposing lengthwise edges, and said step of forming a core member further comprises:

forming a plain part on each of said lengthwise edges, said plain part extending along the entire length of said electrode plate; and forming flat parts between each two protruding rows at locations where respective non-processing parts of both the processing rolls interengage with each other;

densely coating the core member with a mixture paste chiefly comprising an active material; and wherein a plain part in the core member is corrugated by forming grooves or ridges therein.

18. The method for producing a battery electrode plate according to any one of claims 12, 13, 14, 16 and 17, wherein a rough finishing treatment is performed to the core member before, after or during it is processed by any one of electrolytic deposition, etching, sandblast, roll transfer, metal spraying and powder sintering techniques.

* * * * *

UNITED STATES PATENT AND TRADEMARK OFFICE
CERTIFICATE OF CORRECTION

PATENT NO. : 6,979,517 B2
DATED : December 27, 2005
INVENTOR(S) : Yoshio Goda et al.

It is certified that error appears in the above-identified patent and that said Letters Patent is hereby corrected as shown below:

Column 15,
Line 23, "said strips farming" should be -- said strips forming --.

Column 16,
Line 11, "claim 6" should be -- claim 5 --.
Line 28, "claim 2" should be -- claim 1 --.
Line 45, "claim 3" should be -- claim 2 --.

Column 17,
Line 22, "metal sheer" should be -- metal sheet --.
Line 41, "plain pan" should be -- plain part --.
Line 43, "electrode place" should be -- electrode plate --.

Signed and Sealed this

Twenty-eighth Day of March, 2006

JON W. DUDAS
*Director of the United States Patent and Trademark Office*